(12) United States Patent
Goetz et al.

(10) Patent No.: US 9,542,166 B2
(45) Date of Patent: Jan. 10, 2017

(54) SYSTEM AND METHOD FOR INFERRING IMMUTABILITY OF PROGRAM VARIABLES

(71) Applicant: Oracle International Corporation, Redwood Shores, CA (US)

(72) Inventors: Brian Goetz, Williston, VT (US); Alexander Buckley, Cupertino, CA (US); Daniel Smith, Spanish Fork, UT (US); Maurizio Cimadamore, Dublin (IE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 360 days.

(21) Appl. No.: 13/677,000

(22) Filed: Nov. 14, 2012

(65) Prior Publication Data

US 2014/0123118 A1    May 1, 2014

Related U.S. Application Data

(60) Provisional application No. 61/720,314, filed on Oct. 30, 2012.

(51) Int. Cl.
- *G06F 9/45* (2006.01)
- *G06F 11/36* (2006.01)
- *G06F 9/44* (2006.01)

(52) U.S. Cl.
CPC . *G06F 8/41* (2013.01); *G06F 8/30* (2013.01); *G06F 8/447* (2013.01); *G06F 11/3672* (2013.01)

(58) Field of Classification Search
CPC .............. G06F 8/41; G06F 8/447; G06F 8/30; G06F 11/3672

USPC .................................................. 717/140, 142
See application file for complete search history.

(56) References Cited

U.S. PATENT DOCUMENTS

| | | | |
|---|---|---|---|
| 4,837,628 A | 6/1989 | Sasaki |
| 5,404,485 A | 4/1995 | Ban |
| 5,485,595 A | 1/1996 | Assar et al. |
| 5,524,230 A | 6/1996 | Sakaue et al. |
| 5,544,356 A | 8/1996 | Robinson et al. |

(Continued)

OTHER PUBLICATIONS

Unkel, "Stationary Fields in Object-Oriented Programs" A Dissertation Submitted tothe Department of Electrical Engineeringand the Committee on Graduate Studiesof Stanford Universityin Partial Fulfillment of the Requirementsfor the Degree of Doctor of Philosophy, Oct. 2009.*

(Continued)

*Primary Examiner* — Viva Miller
(74) *Attorney, Agent, or Firm* — Tucker Ellis LLP

(57) ABSTRACT

In accordance with various embodiments, systems and methods are provided which facilitate inferring immutability of variables. A compiler analyzes local variables within source code to determine whether they are immutable. In particular embodiments the compiler examines locations where each variable is assigned to determine whether the variable was definitely unassigned before the assignment. Because the compiler can infer whether a local variable is immutable, it is possible for the programmer to avoid using a keyword to expressly declare the local variable as immutable. Inferring immutability of variables, thus, maintains correctness of the compiled code while reducing the burden on the programmer.

9 Claims, 3 Drawing Sheets

(56) References Cited

U.S. PATENT DOCUMENTS

| | | | |
|---|---|---|---|
| 5,553,261 | A | 9/1996 | Hasbun et al. |
| 5,581,723 | A | 12/1996 | Hasbun et al. |
| 5,611,067 | A | 3/1997 | Okamoto et al. |
| 5,933,847 | A | 8/1999 | Ogawa |
| 5,966,720 | A | 10/1999 | Itoh et al. |
| 6,119,145 | A | 9/2000 | Ikeda et al. |
| 6,604,168 | B2 | 8/2003 | Ogawa |
| 6,735,680 | B2 | 5/2004 | Ahmad |
| 6,925,638 | B1 * | 8/2005 | Koved .................... G06F 8/433 717/155 |
| 7,590,978 | B2 * | 9/2009 | Chang et al. ................ 717/155 |
| 2003/0018671 | A1 | 1/2003 | Bera |
| 2004/0181713 | A1 | 9/2004 | Lambert |
| 2005/0010898 | A1 | 1/2005 | Ogawa et al. |
| 2005/0086022 | A1 | 4/2005 | Lindberg et al. |
| 2005/0278374 | A1 | 12/2005 | Patrick et al. |
| 2007/0150806 | A1 | 6/2007 | Hartmann |
| 2009/0018811 | A1 | 1/2009 | Paradkar |
| 2009/0144714 | A1 | 6/2009 | Fan et al. |
| 2009/0150864 | A1 * | 6/2009 | Meijer et al. ................ 717/116 |
| 2009/0172649 | A1 | 7/2009 | Teplitsky et al. |
| 2010/0050159 | A1 | 2/2010 | Daniel |
| 2010/0122073 | A1 | 5/2010 | Narayanaswamy et al. |
| 2012/0210308 | A1 * | 8/2012 | Goetz et al. .................. 717/140 |
| 2012/0210320 | A1 | 8/2012 | Goetz et al. |
| 2012/0296922 | A1 * | 11/2012 | Hsu .............................. 707/756 |

OTHER PUBLICATIONS

Clark, Mike, "Using Blocks in iOS 4: The Basics" retrieved Nov. 15, 2013 <http://pragmaticstudio.com/blog/2010/7/28/ios4-blocks-1>, 6 pages.

Diehl, Stephan, "A Formal Introduction to the Compilation of Java", Software-Practice and Experience, vol. 28(3), 297-327(Mar. 1998).

Gosling, James et al., "The Java™ Language Specification Java SE 7 Edition", Release Jul. 2011, Copyright © 2011 Oracle America, Inc., 650 pages.

Goetz, Brian, Interface evolution via "public defender" methods, Third draft, Aug. 2010, 10 pages, retrieved Apr. 2, 2015 from: <http://cr.openjdk.java.net/~briangoetz/lambda/>.

Goetz, Brian, Interface evolution via virtual extension methods, Fourth draft, Jun. 2011, 12 pages, retrieved Apr. 2, 2015 from: <http://cr.openjdk.java.net/~briangoetz/lambda/>.

Goetz, Brian et al., Featherweight Defenders: A formal model for virtual extension methods in Java, Oracle Corporation, Mar. 27, 2012, 9 pages, retrieved Apr. 2, 2015 from: <http://cr.openjdk.java.net/~briangoetz/lambda/>.

Goetz, Brian, Featherweight Defenders, Jan. 19, 2011, 6 pages, retrieved Apr. 2, 2015 from: <http://cr.openjdk.java.net/~briangoetz/lambda/>.

Goetz, Brian, Featherweight Defenders, Jan. 31, 2011, 6 pages, retrieved Apr. 2, 2015 from: <http://cr.openjdk.java.net/~briangoetz/lambda/>.

Goetz, Brian et al., Featherweight Defenders: A formal model for virtual extension methods in Java, Oracle Corporation Dec. 2, 2011, 9 pages, retrieved Apr. 2, 2015 from: <http://cr.openjdk.java.net/~briangoetz/lambda/>.

Reinhold, Mark, Project Lambda: Straw-Man Proposal, licensed under a Creative Commons Attribution-Share Alike 3.0 U.S. License, Dec. 2009, 7 pages, retrieved Apr. 2, 2015 from: <http://cr.openjdk.java.net/~mr/lambda/>.

Goetz, Brian, State of the Lambda, Version 2, Jul. 6, 2010, 7 pages, retrieved Apr. 2, 2015 from: <http://cr.openjdk.java.net/~briangoetz/lambda/>.

Goetz, Brian, State of the Lambda, Oct. 10, 2010, 7 pages, retrieved Apr. 2, 2015 from: <http://cr.openjdk.java.net/~briangoetz/lambda/>.

Goetz, Brian, State of the Lambda, Dec. 2011, $4^{th}$ edition, 10 pages, retrieved Apr. 2, 2015 from: <http://cr.openjdk.java.net/~briangoetz/lambda/>.

Goetz, Brian, Translation of Lambda Expressions, Apr. 2012, 10 pages, retrieved Apr. 2, 2015 from: <http://cr.openjdk.java.net/~briangoetz/lambda/>.

European Patent Office, International Searching Authority, International Search Report and Written Opinion dated Jan. 12, 2016 for International Application No. PCT/US2015/052060, 14 pages.

Jameela Al-Jaroodi et al., "Middleware Infrastructure for Parallel and Distributed Programming Models in Heterogeneous Systems", IEEE Transactions on Parallel and Distributed Systems, vol. 14, No. 11, Nov. 2003, 13 pages.

Laurent Baduel et al., "Programming, Composing, Deploying for the Grid" in Grid Computing: Software Environments and Tools, Spriner, 2006, 30 pages.

United States Patent and Trademark Office, Office Action Dated Apr. 12, 2016 for U.S. Appl. No. 13/677,129, 11 Pages.

* cited by examiner

SYSTEM AND METHOD FOR INFERRING IMMUTABILITY OF PROGRAM VARIABLES

CLAIM OF PRIORITY

This application claims the benefit of priority on U.S. Provisional Patent Application No. 61/720,314, entitled "SYSTEM AND METHOD FOR INFERRING IMMUTABILITY OR PROGRAM VARIABLES", filed Oct. 30, 2012 for which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method for use in compiling software code in a programming language.

BACKGROUND

An immutable variable in a program is a variable which does not change after it is initialized or initially assigned to. Immutable variables allow for optimizations in which a variable's value can be copied and cached rather than re-examined; and language semantics in which the sequencing of variable references is irrelevant.

In comparison compiling code which includes mutable variables which are referenced by higher order functions may result in runtime errors. A mutable variable may change in value before or after it is utilized in a higher order function which references the variable. This can result in a race condition at runtime. For example, thread-safety issues may arise when multiple threads are trying to modify an object's state concurrently (write-write conflicts) or when one thread is trying to access an object's state while another thread is modifying it (read-write conflicts.) Thus, it is useful for a language to prohibit certain accesses to mutable variables in order to prevent runtime errors. In some systems the compiler identifies possibly mutable local variables and throws an error for each possibly mutable local variable such that the programmer has to expressly declare that the variable is immutable using, for example, a keyword.

The Java (Java™ is a registered trademark of Oracle America, Inc.) programming language is a popular programming language. In the Java programming language immutable variables can be expressly declared to be 'final' variables. In previous versions of Java, only local variables that were expressly declared 'final' by a programmer could be referred to an anonymous class declaration. The programmer was thus required to expressly indicate that the local variable was immutable by declaring it as 'final'. This requirement increased syntax bulk and work for the programmer.

SUMMARY

The present invention provides a system and method for facilitating the development and execution of software programs. More specifically, embodiments provide a mechanism for inferring the immutability of variables. An immutable variable in a program is a variable which does not change after it is initialized or initially assigned to. In some programming languages, a variable may be expressly declared to be immutable by the programmer using, for example, a keyword. However, the present invention allows a compiler to infer whether a variable is immutable without requiring the programmer to expressly declare the variable as immutable. The ability to infer whether a variable is immutable is useful in any lexically-scoped imperative programming language.

In accordance with an embodiment of the invention, a compiler identifies the local variables in a program that are guaranteed not to change after they are initially assigned to. The compiler determines whether an assignment can be considered an initialization of the local variable. If a local variable's only assignments are initializations, it can be inferred to be immutable. Any local variable that would have been legally initialized if it were explicitly declared immutable, can be treated the same as a local variable which is explicitly declared to be immutable for the purpose of referring to the local variable. The programming language thereby supports a more attractive syntax by improving conciseness and readability while reducing the burden on the programmer.

The Java programming language is an example of a lexically-scoped imperative programming language. A specific embodiment of the present invention provides for compilation of Java code which relaxes the restriction that only local variables that are declared 'final' by a programmer can be referenced by an anonymous class declaration. The restriction is relaxed for both lambda expressions and anonymous class declarations by also allowing 'effectively final' local variables to be referenced as described herein without throwing an error. A local variable is 'effectively final' if it is inferred to be immutable, i.e. the value of the local variable does not change after it is initialized or initially assigned to.

A specific embodiment of the present invention provides a compiler which is adapted to infer whether a local variable is immutable and, thus, 'effectively final' thereby avoiding the need for the programmer to expressly declare the local variable as 'final' or rewrite the code. Advantageously, the compiler can avoid indicating an error for local variables that are 'effectively final' though not declared 'final' without decreasing the correctness of compilation, i.e. the compiler can compile code in which local variables which are inferred to be 'effectively final' are referenced without incorrectly allowing a mutable local variable to be referenced by an anonymous class declaration or lambda expression.

Other objects and advantages of the present invention will become apparent to those skilled in the art from the following detailed description of the various embodiments, when read in light of the accompanying drawings.

DETAILED DESCRIPTION

Figure 1:
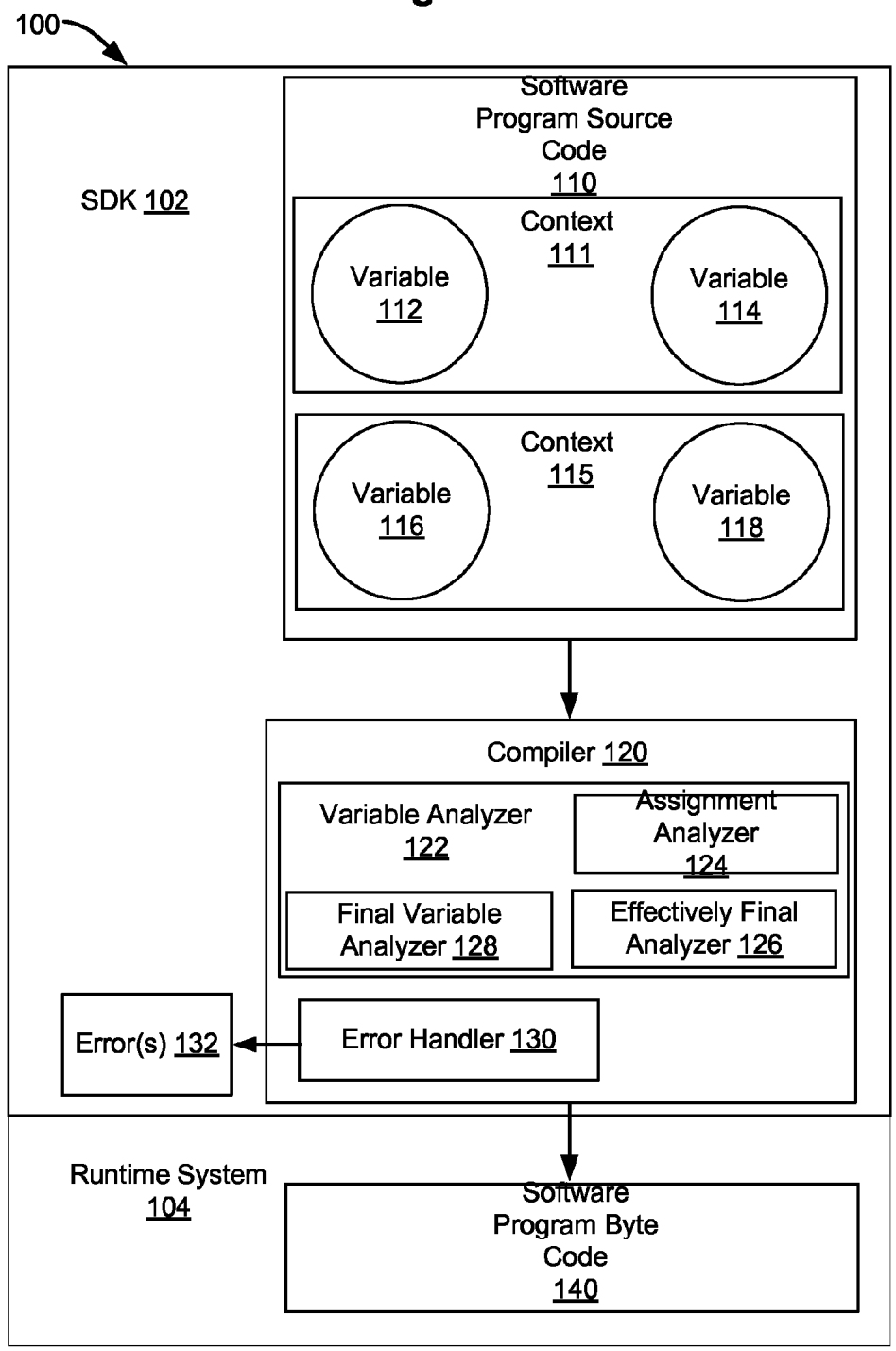
FIG. 1 shows a schematic of a system in accordance with an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Embodiments of the present invention provide a system and method for facilitating the development and execution of a software program. In accordance with various embodiments, systems and methods are provided which facilitate inferring immutability of variables. A compiler analyzes variables within source code to determine whether they can be treated as immutable without compromising the safety of the compiled code and without requiring an express indication of the immutability of the variable.

The present invention provides a system and method for facilitating the development and execution of a software program. More specifically, embodiments provide a mechanism for inferring the immutability of variables. Immutable variables are variables whose value is never changed after it is initialized or initially assigned to. In some programming languages, a variable may be expressly declared as an immutable variable by the programmer using, for example, a keyword. However, the present invention allows a compiler to infer whether a variable is immutable without requiring the programmer to expressly declare the variable as immutable using a keyword.

The ability to infer whether a variable is immutable is useful in any lexically-scoped imperative programming language for a number of reasons:

First, the value of an immutable variable may be inlined, which supports partial evaluation of a program at compile-time (allowing smaller code to be generated) or run-time (enhancing just-in-time compilation and therefore producing faster code);

Second, inferring that a variable is immutable is especially useful if the language additionally supports higher-order functions capable of acting as "closures" because they may refer to variables in the lexical scope; and Third, certain languages choose to restrict higher-order functions to refer to immutable variables only, in which case inferring immutability of a variable avoids the need for the programmer to expressly declare the variable as immutable (to avoid generating an error).

Higher-order functions which refer to mutable local variables introduce many concurrency-related problems. However, the present invention mitigates the problem of anonymous class declarations and lambda expressions being unable to refer to mutable local variables. Examples of anonymous class declarations and lambda expressions are provided below.

Example I illustrates an anonymous class declaration that does not refer to any local variables.

Example I

```
FileFilter x = new FileFilter( ) {
    public boolean accept(File f) {
        return f.getName( ).endsWith(".java");
    }
}
```

A lambda expression is like a method: it provides a list of formal parameters and a body—an expression or block—expressed in terms of those parameters. Example II illustrates a lambda expression that does not refer to any local variables. Note that the lambda expression is a stripped-down form of the anonymous class declaration (see Example I)—the parameter of the lambda expression is the same as the parameter to the anonymous class declaration's method, and the body of the lambda expression is the same as the body of the anonymous class declaration's method (but is able to elide the 'return' keyword because the only thing this particular lambda expression's body does is return a value).

Example II

FileFilter x=(File f)−>f.getName( ).endsWith(".java");

Example III illustrates an anonymous class declaration that attempts to refer to a mutable variable in order to mutate it.

Example III

```
int sum = 0;
list.forEach(new Block<Product>( ) {
    public void apply(Product e) {
        sum += e.size( );
    }
}
```

Example IV illustrates a Lambda expression that attempts to refer to a mutable variable in order to mutate it.

Example IV

```
int sum = 0;
list.forEach(Product e -> { sum += e.size( ); });
```

With respect to Examples III and IV, above, note that, because the forEach method might use multiple threads to execute the body of the apply method/lambda expression (to process list elements in parallel), the sum variable will be read and written by different threads which will likely lead to an incorrect value of sum at the end. This anonymous class declaration and lambda expression are deemed illegal because they mutate a variable which has been referenced (i.e. is from the enclosing lexical scope).

To ensure correctness, certain languages, for example the Java programming language, allow only immutable local variables to be referenced by higher-order functions such as anonymous class declarations. Historically, that meant local variables were required to be declared as immutable using, for example, the keyword 'final' in the Java programming language. Example V shows an anonymous class declaration that refers to a 'final' local variable, 'before', which indicates the cut-off time for file modifications.

Example V

```
final long before = ...;
root.listFiles(new FileFilter( ) {
    public boolean accept(File f) {
        return f.lastModified( ) <= before;
    }
});
```

Example VI shows Lambda expression that refers to a 'final' local variable, 'before', which indicates the cut-off time for file modifications.

Example VI

```
final long before = ...;
root.listFiles(File f -> f.lastModified( ) <= before);
```

Using an embodiment of the present invention it is possible for the compiler to infer that the 'before' variable in this code is immutable. It is, therefore, possible for the programmer to avoid using a keyword ('final') to explicitly declare this local variable as immutable. The ability to infer that the local variable is immutable allows anonymous class declarations and lambda expressions to refer to the local variable safely. Inferring immutability of variables ensures correctness of the code while reducing the burden on the programmer (both the author of the code and its many subsequent readers).

Embodiments of the present invention infer immutable variables for improved compilation and exception handling. A property of inference of immutability is that an inferred-immutable variable can be explicitly declared as immutable (for example, by adding the keyword 'final') without changing the semantics of higher-order functions which refer to the variable; and a variable explicitly declared as immutable in a valid program can have the declaration of immutability removed (for example, by removing the keyword 'final') without affecting the semantics of higher-order functions which refer to the variable.

Specific Embodiment of the Invention

The invention will now be illustrated by reference to a particular implementation in the Java programming language. The Java programming language is an example of a lexically-scoped imperative programming language. The ability to infer whether a variable is immutable is a useful addition to the Java programming language for the following reasons:

First, the value of an immutable variable may be inlined, which supports partial evaluation of a Java program at compile-time (allowing smaller code to be generated) or run-time (enhancing just-in-time compilation and therefore producing faster code);

Second, inferring that a variable is immutable is especially useful in Java because the language supports higher-order functions in the form of anonymous class declarations and lambda expressions which are treated as normal reference-typed values and are capable of acting as closures; and Third, for concurrency reasons, the Java programming language allows only immutable variables to be referenced, and inferring immutability of a variable avoids the need for the programmer to expressly declare the variable as immutable (using the keyword 'final') to avoid generating an error.

The specific embodiment of the present invention enhances the Java programming language by mitigating the problem of anonymous class declarations and lambda expressions being unable to refer to mutable local variables. Referring to mutable variables introduces many concurrency-related problems. Previously, the Java programming language required a programmer to indicate that a local variable was immutable by using the keyword 'final'.

In the specific embodiment, the present invention provides for compilation of Java code which relaxes the restriction that only local variables that are declared 'final' by a programmer can be referenced as part of an anonymous class declaration or lambda expression. Local variables include variables declared in the body of a method as well as formal parameters of a method, formal parameters of a constructor, formal parameters of a lambda expression, and exception parameters in a 'catch' clause. The restriction is relaxed for both lambda expressions and anonymous class declarations by allowing these higher-order functions to refer to 'effectively final' local variables as described herein. Embodiments of the present invention allow a compiler to infer whether a local variable is immutable—an 'effectively final' variable—without requiring the programmer to expressly declare the local variable to be immutable using the keyword 'final'.

A local variable is 'effectively final' if its value is never changed after it is initialized or initially assigned to; in other words, declaring the local variable as 'final' would not cause a compilation failure. The compiler is adapted to infer whether a local variable is 'effectively final' thus avoiding the need for the programmer to declare the variable 'final' or rewrite the code.

The definition of effectively-final variables prohibits access to mutable local variables as effectively as the 'final' restriction did before it while reducing the syntactic burden on programmers. Embodiments of the invention utilize a mechanism to guarantee that 'effectively final' and legally declarable as 'final' are equivalent. In effect it should be possible to add or remove the keyword 'final' to any variable that is initially either declared 'final' or 'effectively final' without impacting the validity of the program.

In particular embodiments the compiler examines locations where each variable is assigned to determine whether the variable was definitely unassigned before the assignment. More specifically, embodiments provide a mechanism for compiling code without generating errors in response to referenced variables which, while not declared 'final', are 'effectively final'. The ability of the compiler to infer immutability allows a programming language to maintain correctness of the compiled code while reducing the burden on the programmer.

In accordance with the specific embodiment of the invention, the compiler identifies the local variables in a Java program that are guaranteed not to change after they are initialized. The compiler utilizes the "definitely unassigned" analysis, described below, to determine whether an assignment can be considered an initialization of a variable. If a variable's only assignments are initializations, the variable is deemed 'effectively final' or immutable. Any local variable, that would have been legally initialized if it were declared 'final', can be treated the same as an explicitly declared 'final' variable and is considered immutable. The language supports a more attractive syntax by improving conciseness and readability. This allows the programming language to maintain safety while reducing the burden of syntactic overhead on the programmer.

FIG. 1 shows a schematic of a software language system 100 in accordance with an embodiment of the invention. As shown in FIG. 1, a software development kit (SDK) 102 and a runtime system 104 may be used to manage the development and execution of a software program 110. For example, SDK 102 and runtime system 104 may correspond to the Java Development Kit (JDK) and Java Runtime Environment (JRE) (Java™ is a registered trademark of Oracle America, Inc.).

Software program 110 is developed in source code. Software program 110 may correspond to a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

In one or more embodiments, software program 110 includes contexts 111, 115. Contexts 111, 115 may represent a scope and/or block of the source code of software program 110. The contexts 111, 115 can include one or more local variables 112, 114, 116, 118.

In one or more embodiments, SDK 102 includes a compiler 120 for compiling software program source code 110 into software program byte code 140 operable on runtime system 104. Those skilled in the art will appreciate that compiling code which refers to mutable local variables may result in logical errors such that the results will not be consistent with the specified interpretation of variable references. Compiler 120 includes a variable analyzer 122 which analyzes variables within the source code during compilation.

Variable analyzer 122 determines, inter alia, whether variables, 112, 114, 116, 118 are 'final' variables (explicitly declared immutable) and/or 'effectively final' (inferred-immutable) variables. Variable analyzer 122 can include assignment analyzer 124, 'effectively final' analyzer 126, and 'final' variable analyzer 128. Use of variable analyzer 122 to prevent incorrect execution of software program 110 is discussed in further detail below with respect to FIG. 2.

Any local variable that would have been legally initialized if it were explicitly declared 'final' is treated the same, for the purpose of anonymous class declarations and lambda expressions which refer to the local variable, as a local variable that is explicitly declared as 'final'. Local variables which are neither 'final' nor 'effectively final' variables will still cause error handler 130 to throw an error 132 upon compiling; that is an attempt to refer to a mutable local variable will result in an error at compile time. This allows programming languages to maintain correctness of compilation while reducing the burden on the programmer.

Final variable analyzer 128 determines whether variables in software program 110 are expressly declared to be 'final' variables. A 'final' variable can only be initialized once, either via an initialize or an assignment statement. It does not need to be initialized at the point of declaration. This is called a "blank final" variable.

Certain local variables that are not declared 'final' may instead be considered 'effectively final'. Effectively final analyzer 126 determines whether local variables in software program 110 which are not 'final' variables are 'effectively final' variables. A local variable whose declaration has an initializer is 'effectively final' if it is not final and it never occurs as the left hand operand of an assignment operator or as the operand of a pre-increment, pre-decrement, post-increment, or post-decrement operator. A local variable whose declaration lacks an initializer is also 'effectively final' if all of the following are true:

It is not explicitly declared 'final';
Whenever it occurs as the left hand operand of an assignment operator, it is definitely unassigned before the assignment (that is, it is definitely unassigned after the right hand operand of the assignment); and
It never occurs as the operand of a pre-increment, pre-decrement, post-increment, or post-decrement operator.

Note that it is possible, though unusual, for a compound assignment, increment, or decrement operator to set the value of a definitely unassigned variable, as long as the variable is also definitely assigned. Such cases can only occur in contexts in which the flow analysis determines that the expression will never be evaluated. If a local variable is 'effectively final', adding the 'final' modifier to its declaration will not introduce any compile time errors. Conversely, a local variable that is declared 'final' in a valid program becomes 'effectively final' if the 'final' modifier is removed.

When the compiler 120 analyzes a local variable to determine whether it is 'effectively final' it leverages assignment analysis of the local variable. The analysis relies upon determining whether the local variable is definitely unassigned before assignment and expressions. Variable analyzer 124 thus includes assignment analyzer 124 which examines all locations of assignment of the local variable.

Assignment analyzer 124 determines the assignment status of a local variable at points in the software program 110. The analysis includes tracking of assignment status in loops and branches of the software program 110. When a local variable is initially declared it starts off definitely unassigned. At this point it is not known whether the local variable will be assigned or not. At a later point in the code the local variable will be initialized and can thus be marked as definitely assigned. If there is no initialization of the local variable, it can be marked as definitely unassigned.

At compile time the compiler 120 analyzes each local variable in the code utilizing assignment analyzer 124. The compiler 120 tracks two bits for each variable definitely assigned (true/not true) and definitely unassigned (true/not true). A detailed description of the analysis of definite assignment of variables is provided in Chapter 16 of "The Java™ Language Specification: Java SE 7 Edition" published Jul. 27, 2012 which is incorporated herein by reference.

For example, if there is a variable declaration and, in the next line of code, the local variable is initialized with some value, then the compiler can mark the local variable as definitely assigned and not definitely unassigned. Whereas, if there is a variable declaration in a block of code, but no initialization of the local variable in that block of code, the compiler can mark the local variable as definitely unassigned and not definitely assigned.

The definitely assigned and definitely unassigned properties of local variables can be used by the compiler to detect errors. For example, the final variable analyzer 128 of the compiler 120 can use the definitely unassigned analysis to determine logical errors in the use of 'final' variables. If a variable is declared 'final', but is not assigned to before it is used, the compiler throws an error. Essentially, the variable has been improperly, declared 'final' when there is the possibility of changing the value of it (when it becomes assigned).

Furthermore, the definitely assigned and definitely unassigned properties of variables can be used by the compiler to infer immutability of a variable (i.e. that the local variable is 'effectively final'). If at all locations of assignment, the non-final local variable was definitely unassigned prior to the assignment, the compiler can determine that the non-final local variable is 'effectively final'. If however, a local variable is definitely assigned prior to an assignment, it is clear that the non-final local variable is being changed and, thus, cannot be treated as 'effectively final'. Essentially the non-final variable is assigned to more than once and thus is a mutable variable.

Figure 2:
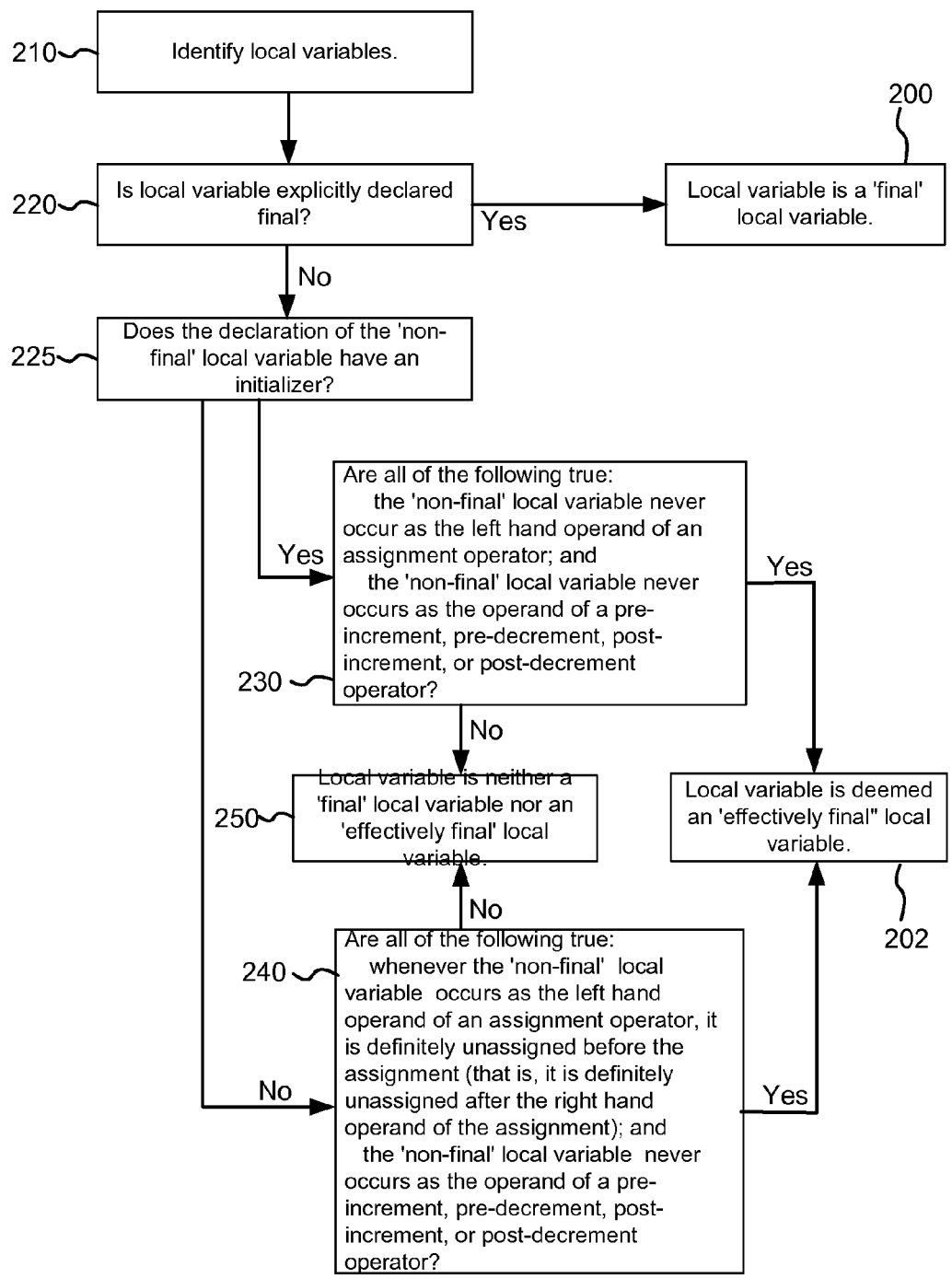
FIG. 2 shows a flow chart of a mechanism for determining whether a variable is 'effectively final' in accordance with an embodiment of the invention.

FIG. 2 shows the use of 'effectively final' analyzer 126 to analyze software program 110 during compilation. Closing over mutable variables in an anonymous class declaration or lambda expression introduces many concurrency-related problems. The 'effectively final' analysis mitigates the problem of anonymous class declarations and lambda expressions being unable to capture non-final local variables.

The effectively final analyzer 126 identifies a class of 'effectively final' variables which include all non-field variables for improved exception handling. The definition of effectively-final variables prohibits access to dynamically-changing local variables as the 'final' restriction did before it; it also reduces the clerical burden on programmers.

The effectively final analyzer 126 utilizes the method shown in FIG. 2 to guarantee that 'effectively final' and legally declarable as 'final' are equivalent. The result of the method is to make it possible to add or remove the keyword 'final' to any variable that is initially either declared 'final' or 'effectively final' without impacting the validity of the program.

As shown in FIG. 2, at compile time, the compiler 120 identifies local variables in the code at step 210. At 220, the compiler 120 determines whether the local variables are declared 'final'. If the variable is declared 'final', the variable is marked as a 'final' variable 200.

Certain local variables that are not explicitly declared 'final' ('non-final' local variables) may instead be determined to be effectively final. At step 225, the compiler determines whether the declaration of the 'non-final' local variable includes an initializer. At step 230, the compiler 120 examines the 'non-final' local variables whose declaration includes an initializer to determine whether the 'non-final' local variable occurs as the left hand operand of an assignment operator or as the operand of a pre-increment, pre-decrement, post-increment, or post-decrement operator. A 'non-final' local variable whose declaration includes an initializer is deemed an 'effectively final' variable 202 if all of the following are true:

The 'non-final' local variable never occurs as the left hand operand of an assignment operator; and The 'non-final' local variable never occurs as the operand of a pre-increment, pre-decrement, post-increment, or post-decrement operator.

If the 'non-final' local variable meets these conditions, it is deemed an 'effectively final' variable 202.

At step 240, the compiler 120 examines the 'non-final' local variables whose declaration lacks an initializer utilizing aspects of the definitely assigned analysis described above. The compiler 120 examines all locations of assignment of the 'non-final' local variable. A 'non-final' local variable whose declaration lacks an initializer is deemed an 'effectively final' variable, if all of the following are true:

Whenever the 'non-final' local variable occurs as the left-hand operand of an assignment operator, it is definitely unassigned and not definitely assigned before the assignment (that is, it is definitely unassigned and not definitely assigned after the right-hand operand of the assignment); and The 'non-final' local variable never occurs as the operand of a pre-increment, pre-decrement, post-increment, or post-decrement operator.

If the 'non-final' local variable meets these conditions, it is deemed an 'effectively final' variable 202.

If a 'non-final' local variable is 'effectively final', adding the 'final' modifier to its declaration will not introduce any compile-time errors. Conversely, a local variable or parameter that is explicitly declared 'final' in a valid program becomes 'effectively final' if the 'final' modifier is removed. If the compiler 120 cannot determine that the variable is a 'final' variable or an 'effectively final' variable according to the above rules, the compiler 120 will throw an error upon compilation if there is an attempt to refer to the local variable. The programmer will have to either declare the variable as 'final' or adjust the code to remedy the error.

Some examples of Java code variables which are 'effectively final' and not "effectively final" are provided below.

Example VII

```
void m1(int x) {
int y = 1;
foo(#{ -> x+y });
// Legal: x and y are both effectively final.
}
```

Example VIII

```
void m2(int x) {
int y;
y = 1;
foo(#{ -> x+y });
// Legal: x and y are both effectively final.
}
```

Example IX

```
void m3(int x) {
int y;
if (..) y = 1;
foo(#{ -> x+y });
// Illegal: y is effectively final, but not definitely assigned.
}
```

Example X

```
void m4(int x) {
  int y;
  if (..) y = 1;
  else y = 2;
  foo(#{ -> x+y });
  // Legal: x and y are both effectively final.
}
```

Example XI

```
void m5(int x) {
  int y;
  if (..) y = 1;
  y = 2;
  foo(#{ -> x+y });
  // Illegal: y is not effectively final.
}
```

Example XII

```
void m6(int x) {
  foo(#{ -> x+1 });
  x++;
  // Illegal: x is not effectively final.
}
```

Example XIII

```
void m7(int x) {
  foo(#{ -> x=1 });
  // Illegal: x is not effectively final.
}
```

Example XIV

```
void m8( ) {
  int y;
  foo(#{ -> y=1 });
  // Illegal: y is not effectively final.
}
```

Although the invention has been described above with respect to the Java programming language, the invention also finds application in any situation where it is necessary or desirable to facilitate the development and execution of a software program in other program languages, including, for example any lexically-scoped imperative programming language.

The present invention may be conveniently implemented using one or more conventional general purpose or specialized digital computer, computing device, machine, or microprocessor, and/or network of same, programmed according to the teachings of the present disclosure.

Figure 3:
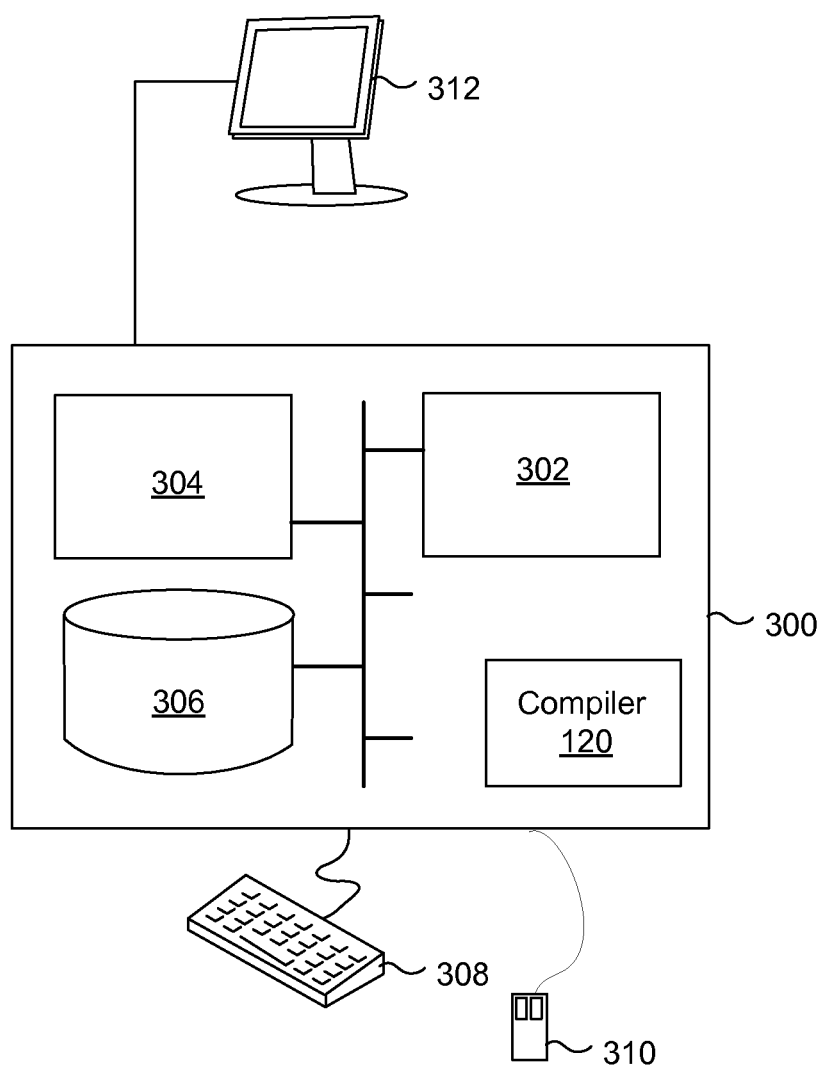
FIG. 3 shows a computer system in accordance with an embodiment of the invention.

FIG. 3 shows a computer system 300 in accordance with an embodiment. Computer system 300 includes a processor 302, memory 304, storage 306, and/or other components found in electronic computing devices. Processor 302 may support parallel processing and/or multi-threaded operation with other processors in computer system 300. Computer system 300 may also include input/output (I/O) devices such as a keyboard 308, a mouse 310, and a display 312.

Computer system 300 may include functionality to execute various components of the embodiments of the present invention as described above. In particular, computer system 300 may include an operating system (not shown) that coordinates the use of hardware and software resources on computer system 300, as well as one or more applications that perform specialized tasks for the user. To perform tasks for the user, applications may obtain the use of hardware resources on computer system 300 from the operating system, as well as interact with the user through a hardware and/or software framework provided by the operating system.

In one or more embodiments, computer system 300 provides a system for facilitating the development and execution of a software program. More specifically, embodiments of computer system provide 300 a mechanism for inferring the immutability of variables. The computer system 300 can include, for example a compiler 120 adapted to infer whether a variable is immutable without requiring the programmer to expressly declare the variable as immutable using a keyword.

In addition, one or more components of computer system 300 may be remotely located and connected to the other components over a network. Portions of the present embodiments (e.g., mechanism, runtime system, etc.) may also be located on different nodes of a distributed system that implements the embodiments. For example, the present embodiments may be implemented using a cloud computing system that remotely manages the development and execution of software programs.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A computer-implemented method for compiling source code using a compiler operating on one or more microprocessor, the method comprising:
   receiving said source code wherein said source code includes a plurality of local variables wherein each of said plurality of local variables is expressed in said source code without the use of a keyword which expressly declares said each of said plurality of local variables as being immutable;
   identifying with the compiler each of said plurality of local variables in said source code;
   for each local variable of the plurality of said plurality of local variables:
      identifying one or more locations in the source code where said each local variable is assigned;
      if said local variable has an initializer, inferring that said local variable is immutable if said local variable never occurs as an operand of a pre-increment, pre-decrement, post-increment, or post-decrement operator in said source code and never occurs as a left-hand operator of an assignment operator in said source code; and
      if said local variable has no initializer, inferring that said local variable is immutable if said local variable never occurs as an operand of a pre-increment, pre-decrement, post-increment, or post-decrement operator in said source code, and at any location is said source code where said local variable occurs as a left-hand operator of an assignment operator said local variable is definitely unassigned before being assigned; and
   compiling said source code with the compiler to generate bytecode, wherein the compiler treats, during compilation, all of said plurality of local variables inferred as immutable in the same manner as a local variable expressly declared to be immutable.

2. The method of claim 1, further comprising:
   throwing an error during said compiling for each of said plurality of local variables unless said each of the plurality of local variables is inferred to be immutable or is not required to be immutable.

3. The method of claim 1, wherein identifying each of said plurality of local variables in the source code comprises identifying each of said plurality of local variables in the source code wherein said each of the plurality of local variables is at least one of a method parameter, constructor parameter, lambda parameter, and exception parameter.

4. A non-transitory computer readable storage medium including instructions stored thereon for compiling source code, which instructions, when executed by a computer, cause the computer to perform steps comprising:
   receiving said source code wherein said source code includes a plurality of local variables wherein each of said plurality of local variables is expressed in said source code without the use of a keyword which expressly declares said each of said plurality of local variables as being immutable;
   identifying with the compiler each of said plurality of local variables in said source code;
   for each local variable of the plurality of said plurality of local variables:
      identifying one or more locations in the source code where said each local variable is assigned;
      if said local variable has an initializer, inferring that said local variable is immutable if said local variable never occurs as an operand of a pre-increment, pre-decrement, post-increment, or post-decrement operator in said source code and never occurs as a left-hand operator of an assignment operator in said source code; and
      if said local variable has no initializer, inferring that said local variable is immutable if said local variable never occurs as an operand of a pre-increment, pre-decrement, post-increment, or post-decrement operator in said source code, and at any location is said source code where said local variable occurs as a left-hand operator of an assignment operator said local variable is definitely unassigned before being assigned; and
   compiling said source code with the compiler to generate bytecode, wherein the compiler treats, during compilation, all of said plurality of local variables inferred as immutable in the same manner as a local variable expressly declared to be immutable.

5. The non-transitory computer readable storage medium of claim 4, wherein the instructions stored thereon, when executed by a computer, cause the computer to perform further steps comprising:
   throwing an error for each identified local variable of said plurality of local variables unless each identified local variable is inferred to be immutable or the identified local variable is not required to be final.

6. The non-transitory computer readable storage medium of claim 4, wherein identifying each of said plurality of local variables in the source code comprises:
   identifying each of said plurality of local variables in the source code wherein the local variable is at least one of a method parameter, constructor parameter, lambda parameter, and exception parameter.

7. A system for compiling source code, the system comprising:
   a computer system comprising one or more microprocessor and memory;
   a compiler operating on said computer system, wherein said compiler is configured to receive said source code wherein said source code includes a plurality of local variables wherein each of said plurality of local variables is expressed in said source code without the use of a keyword which expressly declares said each of said plurality of local variables as being immutable;
   a variable analyzer component of said compiler, wherein said variable analyzer is configured to identify each of said plurality of local variables in said source code, and for each local variable of the plurality of said plurality of local variables:
      identify one or more locations in the source code where said each local variable is assigned;
      if said local variable has an initializer, infer that said local variable is immutable if said local variable never occurs as an operand of a pre-increment, pre-decrement, post-increment, or post-decrement operator in said source code and never occurs as a left-hand operator of an assignment operator in said source code, and if said local variable has no initializer, infer that said local variable is immutable if said local variable never occurs as an operand of a pre-increment, pre-decrement, post-increment, or post-decrement operator in said source code, and at any location is said source code where said local variable occurs as a left-hand operator of an assignment operator said local variable is definitely unassigned before being assigned; and wherein said compiler is further configured to compile said source code to generate bytecode, wherein the compiler treats, during compilation, all of said plurality of local variables inferred as immutable in the same manner as a local variable expressly declared to be immutable.

8. The system of claim 7, wherein:

the compiler comprises an error handler which throws an error during compilation of said source code for each local variable of said plurality of local variables which is not identified as immutable by the variable analyzer unless the local variable is not required to be final.

9. The system of claim 7, wherein each of the plurality of local variables include one or more of method parameters, constructor parameters, lambda parameters, and exception parameters.

* * * * *

UNITED STATES PATENT AND TRADEMARK OFFICE
CERTIFICATE OF CORRECTION

| | |
|---|---|
| PATENT NO. | : 9,542,166 B2 |
| APPLICATION NO. | : 13/677000 |
| DATED | : January 10, 2017 |
| INVENTOR(S) | : Goetz et al. |

It is certified that error appears in the above-identified patent and that said Letters Patent is hereby corrected as shown below:

On the Title Page

In Column 2, under (56) Other Publications, Line 40, delete "Spriner," and insert -- Springer, --, therefor.

In the Claims

In Column 3, Lines 42-43, delete "complier" and insert -- compiler --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*